Inventors
WILLIAM W. PRICE,
CHARLES W. RIPSCH,

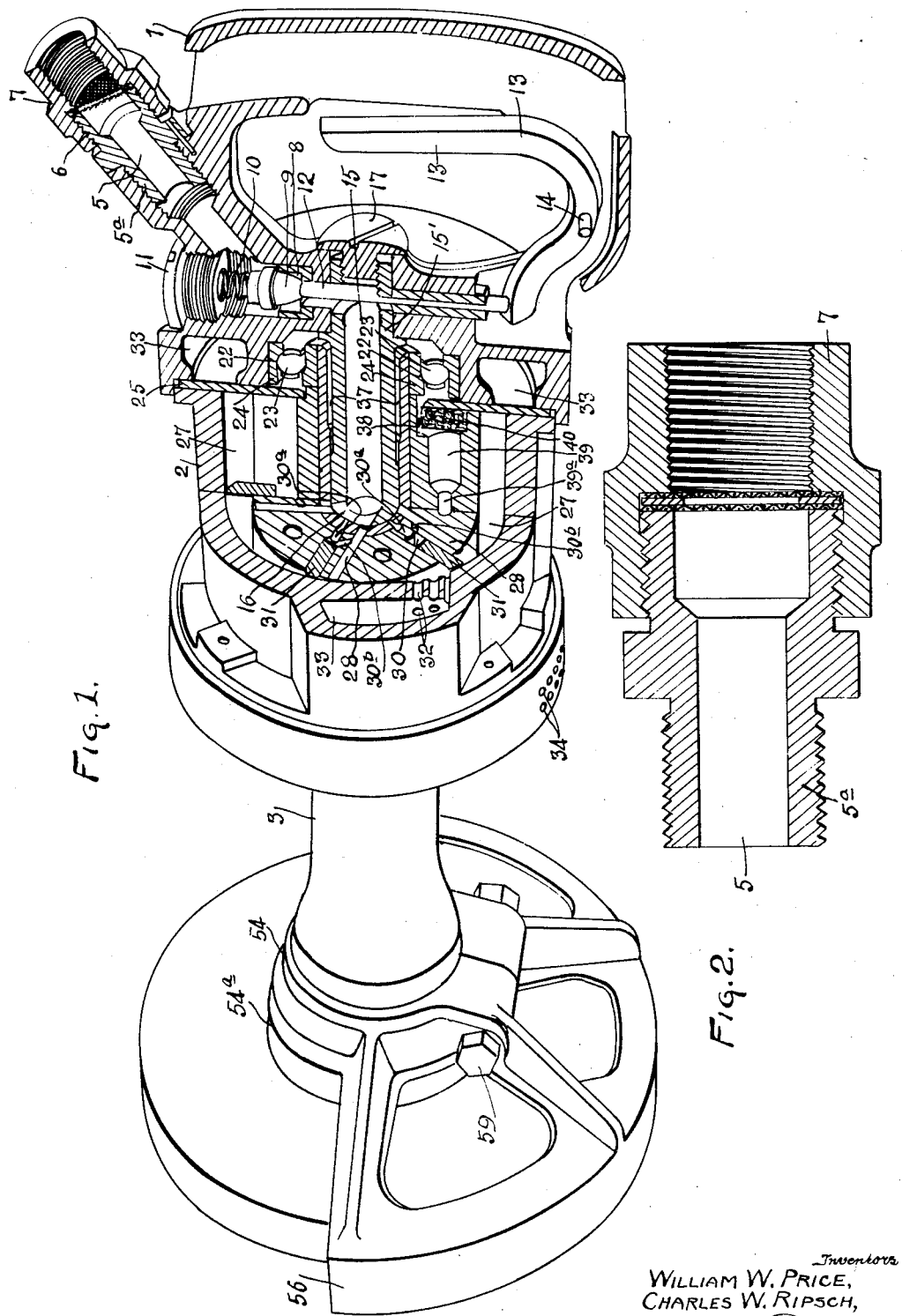

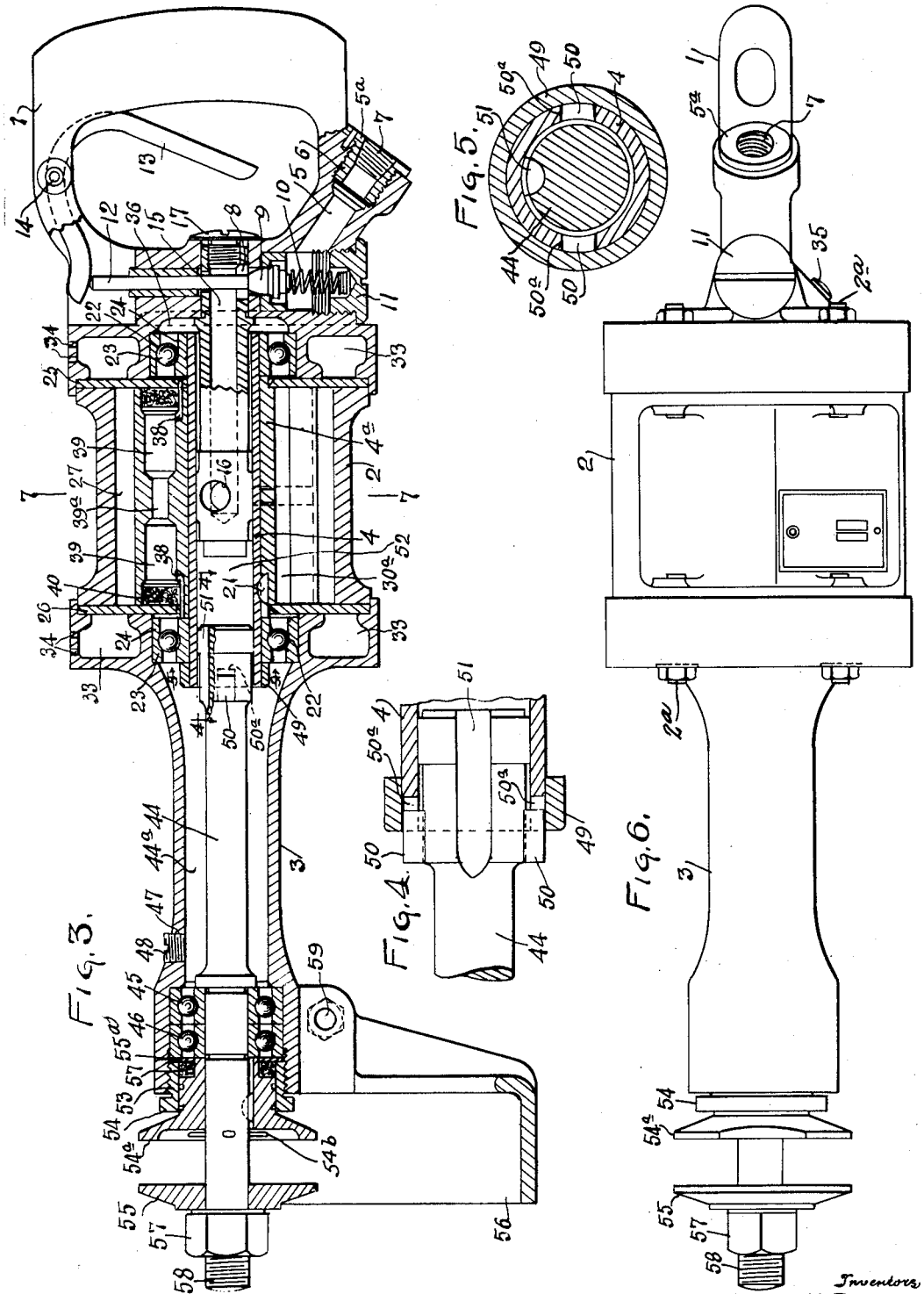

Oct. 17, 1933.　　W. W. PRICE ET AL　　1,931,167
PNEUMATIC TOOL
Filed July 2, 1927　　4 Sheets-Sheet 4
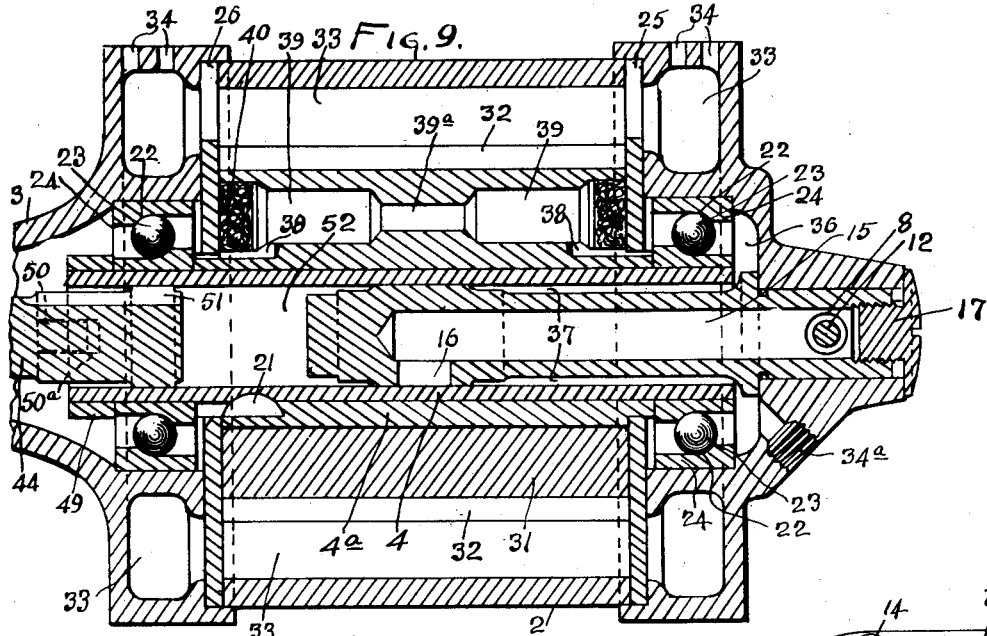
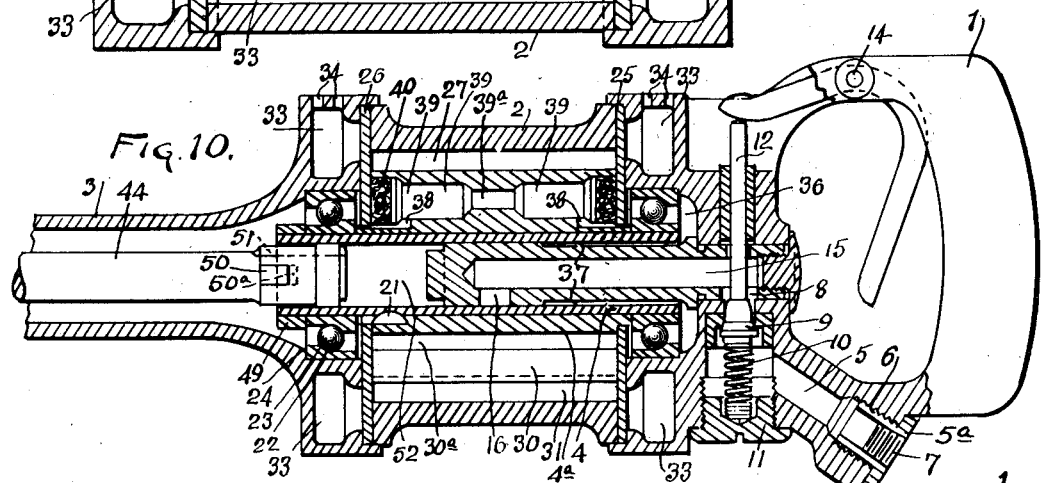
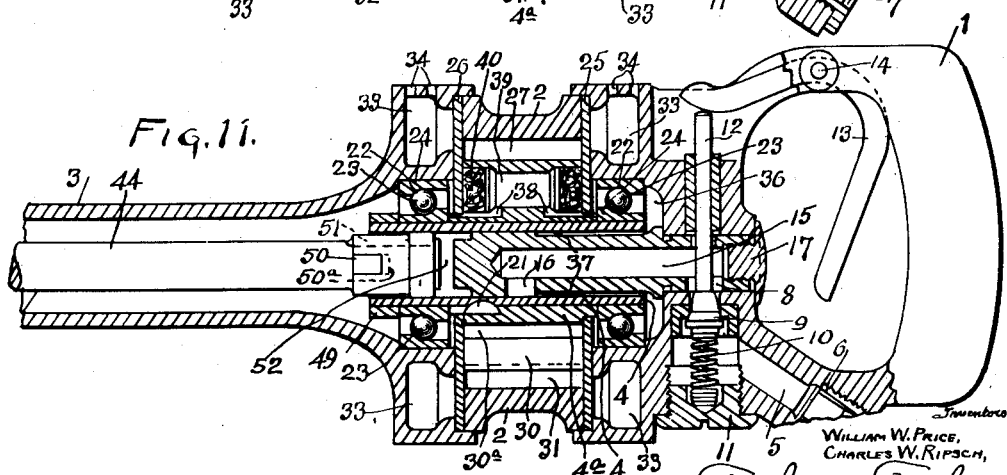

Patented Oct. 17, 1933

1,931,167

UNITED STATES PATENT OFFICE 1,931,167

PNEUMATIC TOOL

William W. Price and Charles W. Ripsch, Dayton, Ohio, assignors to The Buckeye Portable Tool Company, Dayton, Ohio, a corporation of Ohio Application July 2, 1927. Serial No. 203,062

5 Claims. (Cl. 121—34)

Our invention relates to improvements in pneumatic implements or tools designed to rotate at high speeds emery or carborundum wheels, drills, etc.

Our invention is in the nature of an improvement on the air-driven implement set forth in the copending application, Serial No. 720,682, filed June 17, 1924, Patent No. 1,758,760, granted May 13, 1930.

The objects of our invention are essentially to simplify and construct a rotor element with air and lubricant chambers and the ports therefor, so as to facilitate the manufacture of the implement; to provide for causing the air or pressure medium, which constitutes the motive agent, to operate on blades of the rotor by pressure through a part of the stroke and by pressure due to expansion during the remainder of the stroke; and also to enable the introduction of the air into the cylinder in a manner to hasten and to make earlier the impulses of the blades so as to increase the speed of rotation; to provide passageways for the lubricant or grease from the supply opening on through the tool, so that the lubricant will have a continuous flow from its entrance into, to and past all of the ball bearings of the rotor and the ball bearings of the shaft, as well as into the lubricant chambers in the rotor, and thence in attenuated quantities into the cylinder to make the blades slide easily; to provide an interlocked and flexible connection between the rotor shaft and the driven shaft so that while the rotor shaft will drive or rotate the other shaft, still any lack of perfect alignment of the bearings of the two shafts will not cause any binding of either shaft; and thrust on the other shaft will not be transmitted to the rotor shaft; to provide a means of governing the speed and power or torque exerted by the tool, this means comprising the provision of interchangeable cylinders carrying rotor elements provided with three or five blades, it being found that three blades give more speed to the rotor, but less pull or torque, while five blades give less speed and more pull or torque; to provide a means for governing the speed and power of the tool by providing interchangeable cylinders of different lengths, it being found that the length of the cylinder governs the said speed and power; for example, the shorter cylinder increases the speed and reduces the torque or pull, while a longer cylinder decreases the speed and increases the torque or pull; to provide an air seal between the cylinder wall and the rotor and blades; which seal maintains the pressure of air in the space between each blade and said seal; to provide in the air inlet a strainer for the air whereby dust and similar suspended particles in the air may be taken out before the air gets into the mechanism of the tool; and finally to provide expansion chambers for the air in the cylinder walls, and to provide a plurality of ports leading from the said chamber into the outer atmosphere, thereby to eliminate any disagreeable whistle during the operation of the tool.

Referring now to the drawings:

Figure 1 represents a perspective view of the tool, with parts in section.

Figure 2 represents the construction of the air inlet, showing the filter medium in place.

Figure 3 is a longitudinal section taken through the central plane of the tool.

Figure 4 is a partial section on the line 4—4 of Figure 3.

Figure 5 is a section taken on the line 5—5 of Figure 3.

Figure 6 is a bottom plan view showing the outside casing of the tool.

Figure 9 is a longitudinal section through the cylinder section of the tool, the view being taken at right angles to the showing of Figure 3.

Figure 10 is a view similar to Figure 3 showing the section through the cylinder section of the tool. Figure 10 shows a comparison of a cylinder head with a shorter cylinder, such as shown in Figure 11.

Figure 11 is a view similar to Figure 10 but showing a shorter cylinder inserted between the heads, the handle portion and the so-called driven portion being thereby brought closer together.

Figure 7:
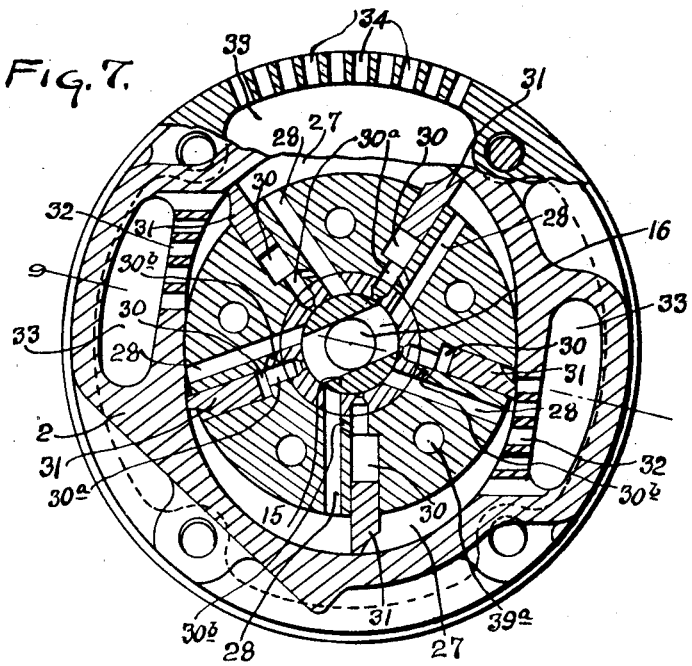
Figure 7 is a view on the line 7—7 of Figure 3.

Referring to the drawings, it will be seen that the improved implement is composed of four general sections, the handle section indicated generally at 1; the cylinder section indicated generally at 2, the driven shaft section indicated at 3, and the rotor element indicated by 4 and 4a.

The handle section consists of a handle proper having an air inlet channel 5 into which is screwed a bushing 5a to receive a coupling 7 adapted for connection with a hose or other means of supply of the pressure medium constituting the motive agent, which may be compressed air.

The channel 5 leads into an inlet passage 8 controlled by valve 9 seated by a spring 10, held in place by a screw threaded cap 11. The valve has an extended stem 12 which projects outside of the handle section and is adapted to be raised off its seat by a bell crank lever 13 pivoted at 14. When the valve 9 is lifted from its seat the air under pressure will enter from the air inlet 5 into the passage 8, and thence into a passageway in a fixed valve cylinder 15', as shown in Figures 1 and 3. From the passageway 15 the air passes through a port 16 into the rotor element, as hereinafter described. Surrounding the valve cylinder 15' is a sleeve 4 to which is united the rotor element, designated as 4a. This construction will be evident from an examination of Figures 1, 3, 7 and 8.

Figure 8:
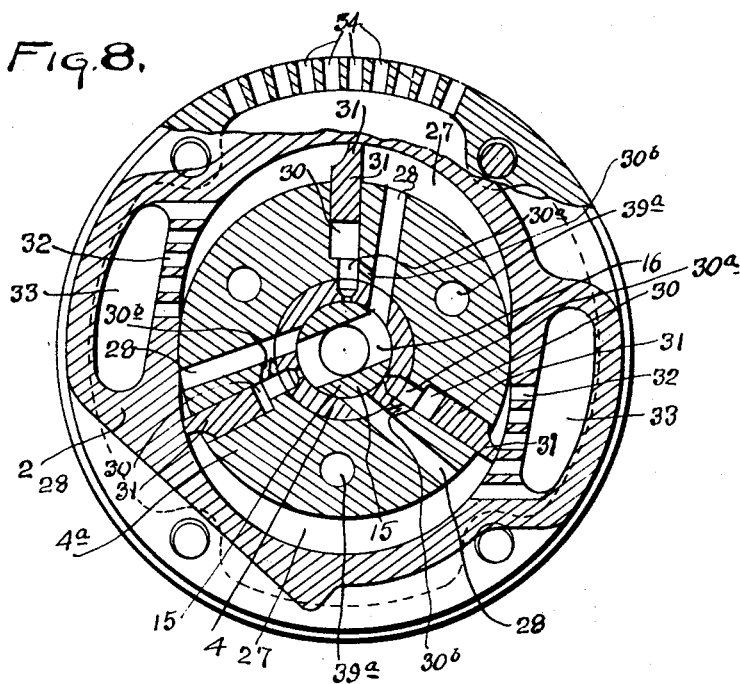
Figure 8 is a view similar to Figure 7, but showing the rotor carrying three blades instead of five.

As seen from the drawings, particularly with respect to Figures 1, 7 and 8, the rotor 4a is provided with a series of passages 28 leading from the passageway 15 through the body of the rotor. The rotor is also provided with air chambers 30, these air chambers communicating with the passageway 15 by means of the passages 30a. Within these chambers 30 are provided the sliding blades 31.

It will be seen, therefore, that as the sleeve 4 rotates the rotor 4a is also rotated, its motion being caused by the arrangement of the passages 28 in the rotor, the arrangement of these passages being such that at least one of them is always in registry with the port 16 of the passageway 15. The blast of air entering the passageway 15, passing through the port 16 enters a passageway 28 and gives an initial impulse to the rotor. As will be seen the rotor operates on bearings 23 held on the seat 22 in a ball race 24. This arrangement of bearings is provided for each end of the rotor, and provide means whereby the shafts will be easily rotated, as hereinafter seen.

The arrangement of the rotor within the cylinder walls is such that the rotor seals therewith at two points, diametrically opposite each other. This will be seen from Figures 1, 7 and 8.

It will be seen that as the rotor 4a rotates, the air from the passageway 15 will enter the passages 28 and will cause the rotation to proceed. The walls of the cylinder are so shaped that a chamber will be defined between the periphery of the rotor and the inner periphery of the cylinder walls so that as the said rotor rotates, the sliding blades will be forced by the air pressure back of them in chamber 30 against the cylinder walls, and will thereby form a compression chamber, which under the influence of the air blasts being admitted through the ports 28, will cause the rotor to rotate at very high velocity, the compressed air in the chambers designated as 27, passing from the said chambers into the chambers 33, to be regarded as exhaust chambers, through the ports 32. This passage will be effected, of course, as each blade 31 passes over the ports 32. From the chambers 33 the air will be liberated through ports 34 into the outer atmosphere. By arranging the ports and size of the holes as shown in Figures 7 and 8, the objectionable whistling usually incident to the operation of such devices is eliminated.

It may be here noted that the rotor 4a may be secured to the sleeve 4 in any appropriate manner, as for example by the key 21.

Secured to the cylinder section 2 is a driven shaft section 3. In this section is found the shaft 44, a solid shaft, which is connected to the rotating sleeve 4 by a sliding connection the structure of which is shown in Figure 4. This sliding connection comprises a plurality of fins designated 50, these fins being secured to the shaft 44 in any desired manner, as by welding or casting, or any other appropriate manner. To accommodate these fins the sleeve 4 is recessed, as shown at 50a, said recesses being of a depth sufficient to accommodate the fins 50, and permit of a certain freedom or lengthwise movement of the head of the shaft 44 with the fins in the recesses 50a. A locking ring 49 secures the sleeve 4 from spreading under pressure of fins 50.

When the bearings 45 and 46 become worn the sliding connection prevents any thrust of the working wheel being transmitted to the rotor. This also permits the rotor to be centralized independent of the tool part of the shaft.

It may be noted that the shaft 44 is provided with a groove or passage 51 for lubricant, as will be hereafter pointed out. At the other end of the shaft 44 there is provided a series of bearings 45 and 46, and also means for the connection of an emery wheel, or the like. This means consists of a locking nut 54, in which there is affixed a jaw 54a. This jaw rotates with the shaft by means of the Woodruff key shown. The jaw 54a also presses against the inner race of bearings locking them against end play when emery wheel is in position. A movable jaw 55 fits over the end of the shaft 44, it being adapted to rest against one side of the tool, and to secure the tool in place by means of the nut 57 operating on the threads 58. In the event that the tool employed is an emery wheel or the like, a guard 56 is also provided.

From the above it will be seen that the rotor member is composed of the sleeve 4 having at each end a ball bearing ring 22 mounted to rotate on the balls 23 held in ball recesses 24 secured in any convenient manner, respectively, in the handle section 1 and the driven shaft section 3, as seen best in Figures 1 and 3. This sleeve 4 may be integral with the rest of the rotor or be a separate sleeve fitted firmly in the body of the rotor, indicated by the sleeve 4, and held by a key 21. In this way the rotor is mounted with the least friction within the cylinder 2. Hard steel plates 25 and 26 are placed, respectively, between the handle section and the cylinder 2 and the driven shaft section and the cylinder and clamped firmly in place by bolts 2a which fasten the heads to the cylinders. The rotor body is provided with a series of air chambers 30, as seen in Figures 1, 7 and 8, each of which has an inlet portion 30a adapted to register with the port 16 as the rotor rotates and to connect with air ports 28 by means of ports 30b. These connecting ports also exhaust air pressure back of blades when passing over exhaust ports 32 and 34.

The rotor body is also provided with air passages or ports 28, by means of which the largest part of the air passing from the port 16 is discharged into the chamber 27, as before mentioned. In each of the chambers 30 there is fitted a relatively long blade 31, adapted to slide radially in the chambers. These blades are kept in contact with the inner wall of the cylinder by means of a minor portion of the motive fluid or air which passes from the port 16 through the ports 30a into the chambers 30, where it acts against the blades. In this manner the blades are effectively held against the cylinder wall to make appropriate contact during the periods when the pressure of the expansive action of the air is taking place. As the passages 28 get their supply of air from the same source, it will be seen that the blades are put under effective outward pressure at the time they are receiving the pressure and expansive action of the air. It will also be seen that the air inlet 28 is cut off before the blade reaches the exhaust ports 32. This allows the air to work expansively the same as steam in an engine and it has been found in practice to increase the power of the tool because there is no choking action. This expansive action produces increased speed and reduction in air consumption. As the pistons pass the exhaust ports 32 and the air under expansion discharges, the air in the chambers 30 will back out through the orifice 30b and the ports or passages 28 due to return movement of the blades, caused by their contact with the inner walls of the cylinder.

It will be understood that there is provided a complete system of air passageways by which the motive agent is introduced into the implement and is controlled and directed therethrough in a manner to produce high speed and power according to the quantity and pressure of the air admitted, and that a smooth-running and effective rotation results therefrom.

Reviewing this system, it may be pointed out that the air goes from inlet 5 through opening 8 into passageway 15, out of this passageway through the port 16 into the chambers 30, the ports 28 of the rotor, into the cylinder chamber 27, through ports 32 into the chamber 33, through ports 34 into the outer outside atmosphere.

Reference will now be made to the lubricating system with which the implement is equipped. It consists of a lubricant passage 34a closed by any appropriate closing means, as for example screw cap 35. See Figure 9.

This passage 34a opens into a chamber 36 within the handle section in which the lubricant is forced so that it works its way through the ball bearings, while a portion of the lubricant stream enters the chambers 37 surrounding the valve cylinder 15' and within the sleeve 4. This structure is best shown in Figure 9. From the ball bearings the lubricant passes through the passages 38 into reservoirs 39, these reservoirs being located within the body of the rotor. These reservoirs become filled with lubricant, which is preferably in the nature of a grease of a convenient consistency. The reservoirs 39 also serve as holes for the equalization of air pressure on the ends of the rotor 4a.

At the ends of the reservoirs are porous or absorbent packings 40 through which the lubricant works its way to lubricate the ends of the body of the rotor which contact with the plates 25 and 26. The lubricant then passes through passages 38 and around the ball bearings 23, held in the ring 22, which are secured in any desirable way in the recess 24, exactly in the manner as mentioned above. It then passes out into the chamber 44a, surrounding the driven shaft 44, the chamber 44a serving as a reservoir for the lubricant, it being completely filled thereby. The lubricant works its way down through the bearings 45 and 46, and is retained within the chamber by the seal 55a. This seal 55a is backed by an absorbent packing 57, the seal and its packing effectively preventing any leakage of the lubricant. From the reservoir 44a the lubricant works its way through the groove 51 of the interlocked connection between the sleeve 4 and the driven shaft, and flows into the space 52 between the end of the valve cylinder 15' and the head of the driven shaft 44 carried by the sleeve 4. The lubricant will fill this space 52 and effect a thorough lubrication of the parts.

It will be seen that a means for providing lubricant may be inserted into the portion 3, this means consisting of the opening 47 through the casing 3, the opening 47 being adapted to be closed by any appropriate means such as screw cap 48. If this opening is employed with the introduction of the lubricant the course of the flow of the lubricant will be opposite to that which has been described above. However, after the device is filled with the lubricant, the results will be the same regardless of whether the lubricant was introduced through the opening 35 or 47.

By this lubricating system it has been found that the rotor and its bearings do not heat notwithstanding the high speed of the rotor, ranging from 0 to 20,000 or more revolutions per minute.

At its end, the portion 3 is screw threaded, as shown at 53, and a bushing 54 is screwed therein. Into this bushing is inserted a clamping disc 54a secured to the shaft by a key and maintained in approximate position by a cotter pin 54b. When the wheel is in position it is held by the member 55 cooperating with the member 54a. This member 55 is adjusted against the wheel by a locking nut 57 operating upon the threads 58. An emery wheel may thus be firmly secured on the driven shaft and may easily be applied or removed. This emery wheel is one of the tools that may be operated by this implement.

To protect the operator, a housing 56 is adapted to slip over the section 3 and be clamped thereon by a bolt 59. This housing sufficiently envelopes the emery wheel to protect the operator from flying sparks and hot fragments, as well as against danger in case of breakage of the wheel itself.

Referring to Figure 11, it will be seen that there has been inserted a cylinder section much shorter than that illustrated in the remaining figures, comparison being made for example, with Figure 10. These cylinder sections, while interchangeable, are practically identical in structure. A shorter cylinder increases the speed and reduces the torque or pull of the device, while a longer cylinder decreases the speed and increases the torque or pull. Thus the longer cylinder, and, therefore longer blades afford more power as the longer blades increase the pressure area or surface on which the compressed air acts, while shorter cylinder and therefore shorter blades reduces the pressure area or the surface to be filled, which greatly increases the speed of the tool.

With respect to the air seal formed in the chamber 27, it may be mentioned that this seal maintains a pressure of air in the space between each blade and such seal. This seal is formed by giving the wall of the cylinder at particular points where the rotor seals with the cylinder wall substantially the same radius as the rotor itself so that this part of the cylinder wall has a slight recess or pocket into which the rotor fits, allowing say .0015 of an inch of clearance of the rotor from such part of the cylinder wall.

Referring to Figure 8, it will be seen that in the form shown in this figure the rotor is provided with three blades 31 instead of the five shown in Figure 7. The operation of this type of rotor, which is interchangeable with the other type, is identical with the said other form. With reference to this feature of the number of blades, it may be pointed out that this variation in the number of blades governs the speed and power or torque exerted by the tool, three blades giving more speed to the rotor but less pull or torque, while five blades give less speed and more pull or torque. This is seemingly because there are two expansive chambers or spaces in the cylinder where the air acts expansively, which chambers are in action at the same time with five blades, while with three blades there is one such expansive chamber in action at one time, hence with the five blades and the two expansive chambers there is a greater pull or torque exerted on the rotor by the air than in the case of three blades with one expansive chamber.

Access may be had to the valve stem 12 by the removal of the cap 11 and access may be had to the passageway 15 by the removal of a cap 17, as shown in Figures 1 and 10.

Lastly, there may be particularly mentioned the strainer shown in Figure 2, which consists of two or more wire gauze discs 7a spaced apart by a washer 7b and clamped between the two sections of the air tube. By placing the two discs of gauze slightly apart, it has been found that a very perfect strainer is produced, by which the air is strained of the dust which in turn keeps the dust from entering into the tube to prevent serious injury due to the high speed of the rotative parts. The coupling is made in two parts to facilitate the ready assembly or disassembly for cleaning or renewing the strainer discs.

It will be understood that it is desired to comprehend within our invention such modifications as may be necessary to adapt it to varying conditions.

Having thus fully described our invention what we claim is new and desire to secure by Letters Patent is:

1. In a pneumatic tool, in combination with a handle section having thereon a valve cylinder and a chamber around the valve cylinder and with a driven shaft section having a bearing seat therein, a sleeve supported for rotation on the valve cylinder, bearing members on each end of the sleeve, the bearing members on one end of the sleeve fitting in the chamber and supported by the handle section and the bearing members on the other end of the sleeve supported by the driven shaft section in the bearing seat, a rotor attached to the sleeve, and a cylinder connecting the two sections and containing the rotor.

2. In a pneumatic tool, in combination with a handle section having thereon a valve cylinder and a chamber around the valve cylinder and with a driven shaft section having a bearing seat therein, a sleeve supported for rotation on the valve cylinder, bearing members on each end of the sleeve, the bearing members on one end of the sleeve fitting in the chamber and supported by the handle section and the bearing members on the other end of the sleeve supported by the driven shaft section in the bearing seat, a rotor attached to the sleeve, a metal bearing plate at each end of the rotor adjacent one set of the bearing members, a cylinder around the rotor between the plates, and means for holding sections and the plates to the cylinder.

3. In a pneumatic tool, in combination with a handle section having thereon a valve cylinder and with a driven shaft section, a cylinder connecting the sections, a sleeve on the valve cylinder and having bearing members at each end supported by one of the sections, a rotor attached to the sleeve in the cylinder, and a driven shaft in the driven shaft section connected to the sleeve for longitudinal movement independent of the sleeve.

4. In a pneumatic tool, in combination with a handle section having thereon a valve cylinder and a chamber around the valve cylinder and with a driven shaft section having a bearing seat therein, a rotor supported for rotation on the valve cylinder, bearing members on each end of the rotor, the bearing members on one end of the rotor fitting in the chamber and supported by the handle section and the bearing members on the other end of the rotor supported by the driven shaft section in the bearing seat, and a cylinder connecting the two sections and containing the rotor.

5. In a pneumatic tool, in combination with a handle section having thereon a valve cylinder and a chamber around the valve cylinder and with a driven shaft section having a bearing seat therein, a rotor supported for rotation on the valve cylinder, bearing members on each end of the rotor, the bearing members on one end of the rotor fitting in the chamber and supported by the handle section and the bearing members on the other end of the rotor supported by the driven shaft section in the bearing seat, a metal bearing plate at each end of the rotor adjacent one set of the bearing members, a cylinder around the rotor between the plates, and means for holding sections and the plates to the cylinder.

WILLIAM W. PRICE.
CHAS. W. RIPSCH.